US009846641B2

(12) United States Patent
Franceschini et al.

(10) Patent No.: US 9,846,641 B2
(45) Date of Patent: Dec. 19, 2017

(54) VARIABILITY AWARE WEAR LEVELING

(75) Inventors: Michele Franceschini, White Plains, NY (US); Ashish Jagmohan, Irvington, NY (US); Moinuddin K. Qureshi, White Plains, NY (US); Luis A. Lastras, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 13/525,757

(22) Filed: Jun. 18, 2012

(65) Prior Publication Data
US 2013/0339570 A1 Dec. 19, 2013

(51) Int. Cl.
G06F 12/00 (2006.01)
G06F 12/02 (2006.01)

(52) U.S. Cl.
CPC ...... G06F 12/0246 (2013.01); G06F 12/0292 (2013.01); G06F 2212/7201 (2013.01); G06F 2212/7211 (2013.01)

(58) Field of Classification Search
CPC ............ G06F 12/0246; G06F 12/0292; G06F 2212/7201
See application file for complete search history.

(56) References Cited

U.S. PATENT DOCUMENTS

| 5,341,339 A | 8/1994 | Wells |
| 5,479,638 A | 12/1995 | Assar et al. |
| 7,340,581 B2 | 3/2008 | Gorobets et al. |
| 7,450,420 B2 | 11/2008 | Sinclair et al. |
| 2002/0184432 A1 | 12/2002 | Ban |
| 2007/0204128 A1* | 8/2007 | Lee et al. ........................ 711/173 |
| 2008/0082736 A1 | 4/2008 | Chow et al. |
| 2009/0276570 A1 | 11/2009 | Cheng et al. |
| 2009/0327602 A1* | 12/2009 | Moore et al. .................. 711/114 |
| 2010/0174851 A1 | 7/2010 | Leibowitz et al. |
| 2011/0022931 A1 | 1/2011 | Eleftheriou et al. |
| 2011/0066792 A1 | 3/2011 | Shaeffer et al. |
| 2011/0078369 A1 | 3/2011 | Sauber et al. |
| 2011/0138103 A1 | 6/2011 | Iliadis et al. |
| 2011/0153908 A1 | 6/2011 | Schaefer |
| 2011/0173378 A1 | 7/2011 | Filor et al. |

(Continued)

OTHER PUBLICATIONS

Ferreira et al., "Increasing PCM Main Memory Lifetime", Department of Computer Science, University of Pittsburgh, Design Automation and Test in Europe Conference & Exhibit (2010), Publication year 2010, pp. 914-919.

(Continued)

*Primary Examiner* — Shawn X Gu
(74) *Attorney, Agent, or Firm* — Harrington & Smith; Daniel Morris

(57) ABSTRACT

Techniques are presented that include determining, for data to be written to a nonvolatile memory, a location in the nonvolatile memory to which the data should be written based at least on one or more wear metrics corresponding to the location. The one or more wear metrics are based on measurements of the location. The measurements estimate physical wear of the location. The techniques further include writing the data to the determined location in the nonvolatile memory. The techniques may be performed by methods, apparatus (e.g., a memory controller), and computer program products.

25 Claims, 9 Drawing Sheets

(56) References Cited

U.S. PATENT DOCUMENTS

| 2011/0246709 | A1 | 10/2011 | Chen et al. | |
|---|---|---|---|---|
| 2011/0271046 | A1 | 11/2011 | Iyer et al. | |
| 2011/0281202 | A1 | 11/2011 | Hanazono et al. | |
| 2012/0096217 | A1* | 4/2012 | Son et al. | 711/103 |

OTHER PUBLICATIONS

Lin et al., "Garbage Collection Policy for Flash Aware Linux Swap System", Electronics Letters, Oct. 27, 2011, vol. 47, No. 22.

Hu et al., "Container Marking: Combining Data Placement, Garbage Collection and Wear Levelling for Flash", 19th Annual IEEE International Symposium on Modelling, Analysis and Simulation of Computer and Telecommunication Systems, Publication Year 2011, pp. 237-247.

Wear-Leveling Technique for EEPROM Devices, IPCOM000187712D, Sep. 16, 2009.

Seong et al, "Safer: Stuck-At-Fault Error Recovery for Memories", 2010 43rd Annual IEEE/ACM International Symposium on Microarchitecture, Publication Year 2010, pp. 115-124.

Kwon et al., "Swap-Aware Garbage Collection for NAND Flash Memory Based Embedded Systems", Seventh International Conference on Computer Information Technology, 2007 CIT 2007, pp. 787-792.

Murugan et al., "Rejuvenator: A Static Wear Leveling Algorithm for NAND Flash Memory With Minimized Overhead", Mass Storage Systems and Technologies (MSST), 2011 IEEE 27th Symposium on; Publication Year 2011, pp. 1-12.

Pan et al., Exploiting Memory Device Wear-Out Dynamics to Improve NAND Flash Memory System Performance, Rensselaer Polytechnic Institute, USA. FAST 2011.

D Woodhouse JFFS: The journalling flash file system.—Ottawa Linux Symposium, 2001.

J. Kim et al., "A space-efficient flash translation layer for compact flash systems"—IEEE Transactions on Consumer Electronics, vol. 48, No. 2, May 2002.

E Gal et al. "Algorithms and data structures for flash memories"—ACM Computing Surveys (CSUR), Jun. 2005, pp. 138-163.

A. Kawaguchi et al., "A flash-memory based file system" Advanced Research Library, Hitachi Ltd., 1995.

Yuan-Hao Chang et al., "Endurance enhancement of flash-memory storage systems: an efficient static wear leveling design", Proceedings of the 44th annual Design Automation Conference, Jun. 4-7, 2007.

Avraham Ben-Aroya et al. "Competitive analysis of flash-memory algorithms. ACM Transactions on Algorithms", 7:23:1-23:37, vol. 7, No. 2, Article 23, Mar. 2011.

* cited by examiner

VARIABILITY AWARE WEAR LEVELING

BACKGROUND

This invention relates generally to non-volatile memory and, more specifically, relates to wear leveling in this memory.

Wear leveling is fundamental part of every controller for nonvolatile memories, including Flash memory and other memories such as phase change memory. The role of wear leveling is to extend the life of a memory system by preventing a small fraction of the memory from being worn out prematurely due to non-uniform access patterns over the address space of the memory. That is, if one fraction of the memory is accessed much more than other fractions, the fraction with the higher access will generally wear out faster than the other fractions.

In conventional systems, an attempt is made to make uniform the number of writes performed on different memory blocks in the memory. While this type of wear leveling has advantages, it could be improved.

SUMMARY

Techniques are presented that include determining, for data to be written to a nonvolatile memory, a location in the nonvolatile memory to which the data should be written based at least on one or more wear metrics corresponding to the location. The one or more wear metrics are based on measurements of the location, the measurements estimating physical wear of the location. The techniques further include writing the data to the determined location in the nonvolatile memory. The techniques may be performed by methods, apparatus (e.g., a memory controller), and computer program products.

DETAILED DESCRIPTION

Figure 1:
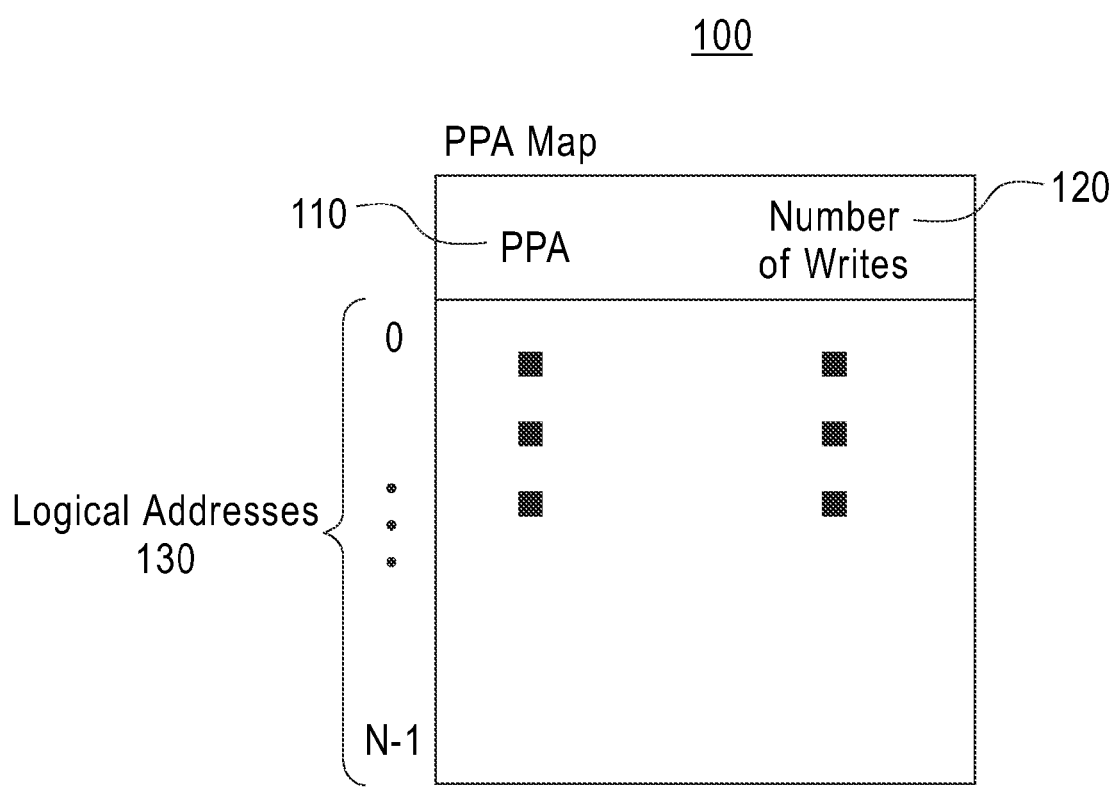
FIG. 1 is an example physical address map with write count metadata.

As stated above, wear leveling is fundamental part of every controller for nonvolatile memories, including Flash memory. All nonvolatile memory has a limited lifetime. Flash cells, as a particular example, have very limited endurance. The aim of wear-leveling is to wear out Flash cells at a roughly uniform rate, by roughly equalizing the number of writes across all Flash blocks. This can be performed, for instance, by storing write-counts as metadata per block. Shown in FIG. 1 is an example physical address map 100 with this type of metadata. In this example, write count metadata is stored as a number of writes 120 for each physical page address (PPA) 110, each of which is mapped to a corresponding one of N logical address 130. This metadata is used to perform the following:

Select an erased block (e.g., by selecting a corresponding PPA 110) which will become the next active block to be written, based on the write counts in number of writes 120; and Select the occupied block (e.g., by selecting a corresponding PPA 110) to be erased based on the write counts (number of writes 120) of occupied blocks. The selected "erased" block is written with the data and the selected occupied block is erased. Note that the map 100 may also include whether blocks are erased or occupied, as additional metadata.

While this type of wear leveling is useful, due to heterogeneities in the memory device, different blocks/cells may not wear at the same rate. Thus, conventional methods may not be optimally effective for maximizing the lifetime of the memory device. The following paper describes and discusses this phenomenon for the case of NAND Flash but does not describe methods for making wear uniform: "Exploiting Memory Device Wear-nut Dynamics to Improve NAND Flash Memory System Performance", Yangyang Pan, Guiqiang Dong, and Tong Zhang, Rensselaer Polytechnic Institute, USA. FAST 2011.

Exemplary embodiments of the instant invention describe systems, program products, and methods for wear-leveling in memory devices, which take into account the variability in wear due to heterogeneity. Exemplary techniques ensure that the wear is made uniform or more uniform across the device, rather than making the number of writes uniform or more uniform across the devices. Techniques are described for NAND Flash memories, as well as other memory devices such as phase change memories/storage class memories.

For ease of understanding and exposition, the description herein is divided into nonvolatile memories that use write-in-place and nonvolatile memories that do not use write-in place (also termed overwrites). By way of introduction, write-in-place is an approach where a data block may be written to the same physical location in memory, without any specific preparation. That is, if a system requests data to be written at a logical address of X, a memory controller may write the data to a corresponding physical address of Y. In terms of conventional wear leveling, the memory controller may write the data at a different physical address (e.g., Z). Regardless, there is some correspondence between logical addresses and physical addresses when data is to be written over data already existing in the memory. NAND Flash is an example of a memory which does not use write-in-place because the memory requires erasing a block of pages before writing a page in the block. Flash typically writes the data to an entire "page" (e.g., a group of cells) at a single time. The pages are grouped into blocks, and the pages typically have to be written one at a time. Furthermore, there is a pool of active pages, and these pages are the pages used for any new writes. Any writes to data already existing on the memory may be performed by writing the data to a new location in memory and marking as invalid the data at the old location.

Regarding variability aware wear leveling for nonvolatile memory using write-in-place, such memory includes phase-change memory (PCM) and storage class memory (SCM) but is not limited to these memories.

Figure 2:
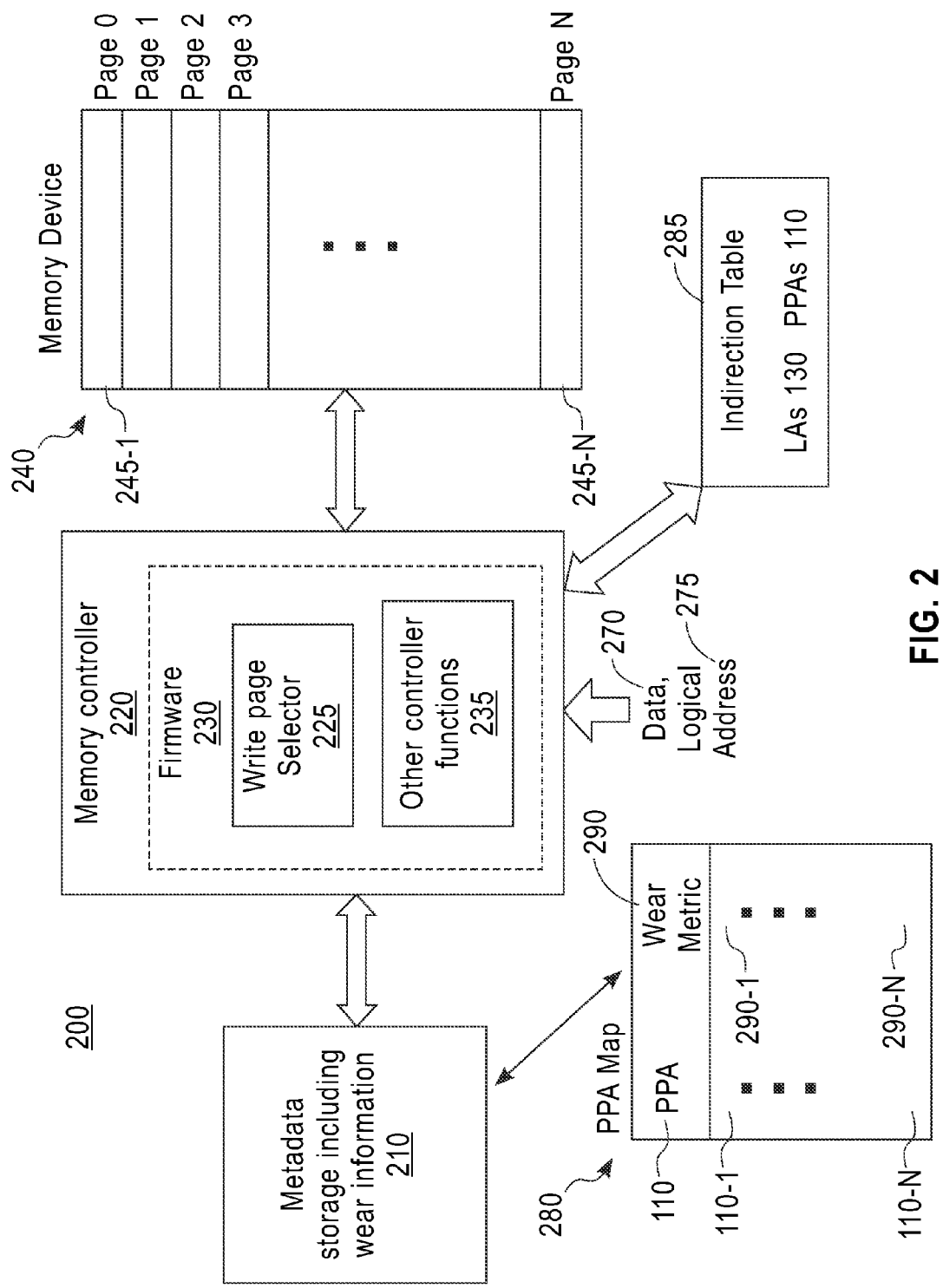
FIG. 2 is a block diagram of an exemplary nonvolatile memory in accordance with an exemplary embodiment of the instant invention.

Turning to FIG. 2, a block diagram of an exemplary nonvolatile memory 200 is shown in accordance with an exemplary embodiment of the instant invention. Nonvolatile memory 200 includes a memory controller 220 that accesses (e.g., reads from and writes to) memory device 240. The memory controller 220 also accesses (e.g., reads from and writes to) metadata storage 210, which includes wear information. Further, the memory controller 220 also accesses (e.g., reads from and writes to) the indirection table 285, which contains a mapping from logical addresses (LAs) 130 to physical page addresses (PPAs 110). The memory device 240 includes a number of pages 245-1 through 245-N of memory. The memory controller 220 includes a write page selector 225 and other controller functions 235. The memory controller 220 implements probabilistic swap-based page selection, e.g., using write page selector 225. Some part or all of the memory controller 220 may be implemented via firmware 230, which is a computer readable storage medium having computer readable program code embodied therewith. Firmware 230 may be updated to modify functionality, and the memory controller 220 may therefore be or include circuitry (e.g., a processor) configured to execute the computer readable program in the firmware 230. Alternatively or in addition, some or all of the functionality of memory controller 220 may be implemented strictly in hardware, such as by circuitry in an integrated circuit.

One example of metadata storage 210 is shown as a PPA map 280, which is similar to the PPA map 100 shown in FIG. 1. However, the PPA map 280 includes a wear metric 290. Metadata tracking the physical wear of each physical page is included as the wear metric 290. The wear metric 290 is an entity that corresponds to a measurement of the state of the memory and that estimates a physical wear of the location, hence a number of writes is not a wear metric. Each of the PPAs corresponds to one (e.g., or more) of the pages 245. It is noted that the indirection table 285 and the PPA map 280 may be combined if desired.

In an embodiment, the memory device 240 is a PCM memory device comprising a large number of pages 245. For ease of reference, the locations in memory being accessed herein are referred to as pages (e.g., pages 245). It is noted, however, that pages 245 (and pages described below) may be a set of memory cells written at the same time, as part of a single write operation. Additional examples include a memory word, a cache-line, or some other unit. In conventional systems, wear-leveling is performed by swapping the page being written with another page selected uniformly at random from all the pages 245 in a memory and this swap operation is performed with a probability which is constant and independent of the wear of either page.

By contrast, in an exemplary embodiment, the wear-leveling is variability-aware. That is, the swap probability is a function of estimates of the physical wear of both pages (e.g., the page originally to be written to and a selected page). The wear can be estimated using wear metrics 290 which include, but are not limited to, the observed bit-error rate (BER), as well as physical characteristics such as number of stuck bits in the page and write/read latency, number of defects, read and write power, or storage capacity, all of which may be correlated with the physical wear out of a line (e.g., or other unit of) memory. Thus, the wear metrics are based on measurements of a memory location, and the measurements estimate physical wear of the location. As an example, the line which has a higher BER than average would have a higher probability of being swapped out, and this line would only be swapped out with a line which has lower a BER than average.

As another example, when a page is to be written to with received data 270 (e.g., because a received logical address 275 associated with the data maps to a PPA 110), with some probability, a decision is made (e.g., by write page selector 225) to swap the data of the page with another selected page. The probability of swap is dependent on the page wear (e.g., as quantified by the wear metric 290): the higher the wear, the greater the probability that a swap is performed. In one embodiment, one or more swap candidate pages 245 are selected at random, and the candidate page 245 with the least wear is selected as the page 245 to which the data will be written. In an example embodiment the swap probability increases exponentially with the difference between the page wear and the average wear.

As an example, assume data 270 is requested to be written to a logical address 130, which corresponds to a received logical address 275. If the logical address 130/275 maps via the indirection table 285 to a PPA 110-1 (corresponding to an "original" page 245-1), the probability of swap is based on the corresponding wear metric 290-1. If the memory controller 200 (e.g., the write page selector 225) determines the page 245-1 should be swapped, the memory controller 200 (e.g., the write page selector 225) selects a different PPA 110 and corresponding page 245. Assume the different PPA 110 corresponds to selected page 245-30. The memory controller 200 (e.g., the write page selector 225) then writes the data 275 to the selected page 245-30 instead of to the original page 245-1.

It is noted that if the selected page 245-30 had valid data, the memory controller 220 would read the selected page 245-30 and write the read data to the original page 245-1. Thus, if the memory controller 220 swaps pages X and Y and both have valid data, then both pages X and Y will be written to once. The notion, though, is that address patterns of most workloads show temporal correlations, i.e., if a particular logical address is being written to now, it is likely that this address will be written to frequently in the future as well. Thus once the swap is performed, the future writes to that address will go to X instead of Y. These future writes will cause wear on X and not Y, thereby leading to leveling.

The indirection table 285 tracks the mapping of logical addresses 130 to physical pages (via corresponding PPAs 110).

Figure 3A:
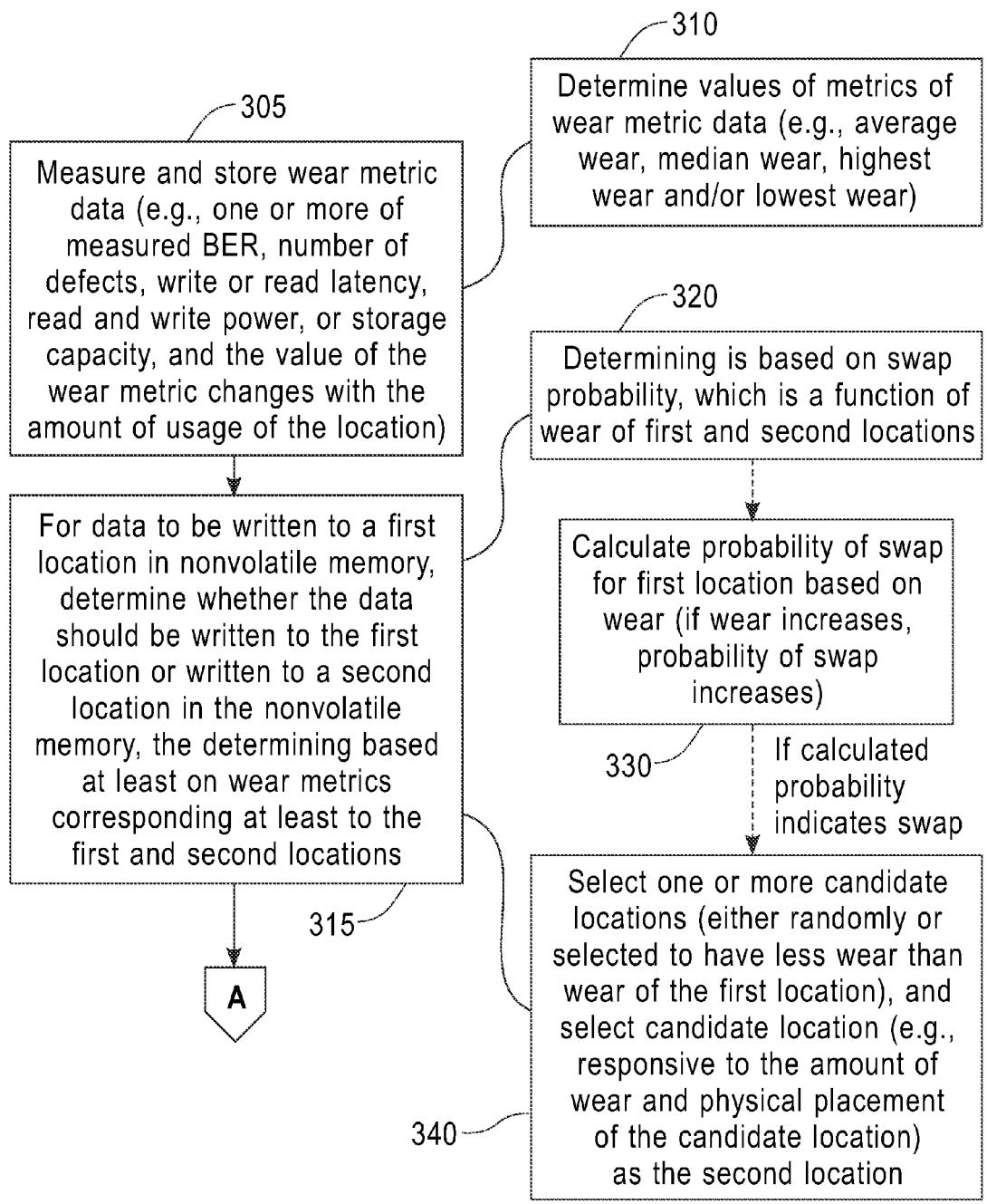
FIG. 3 is a block diagram of a flowchart to provide variability aware wear leveling in an exemplary embodiment.
Figure 3B:
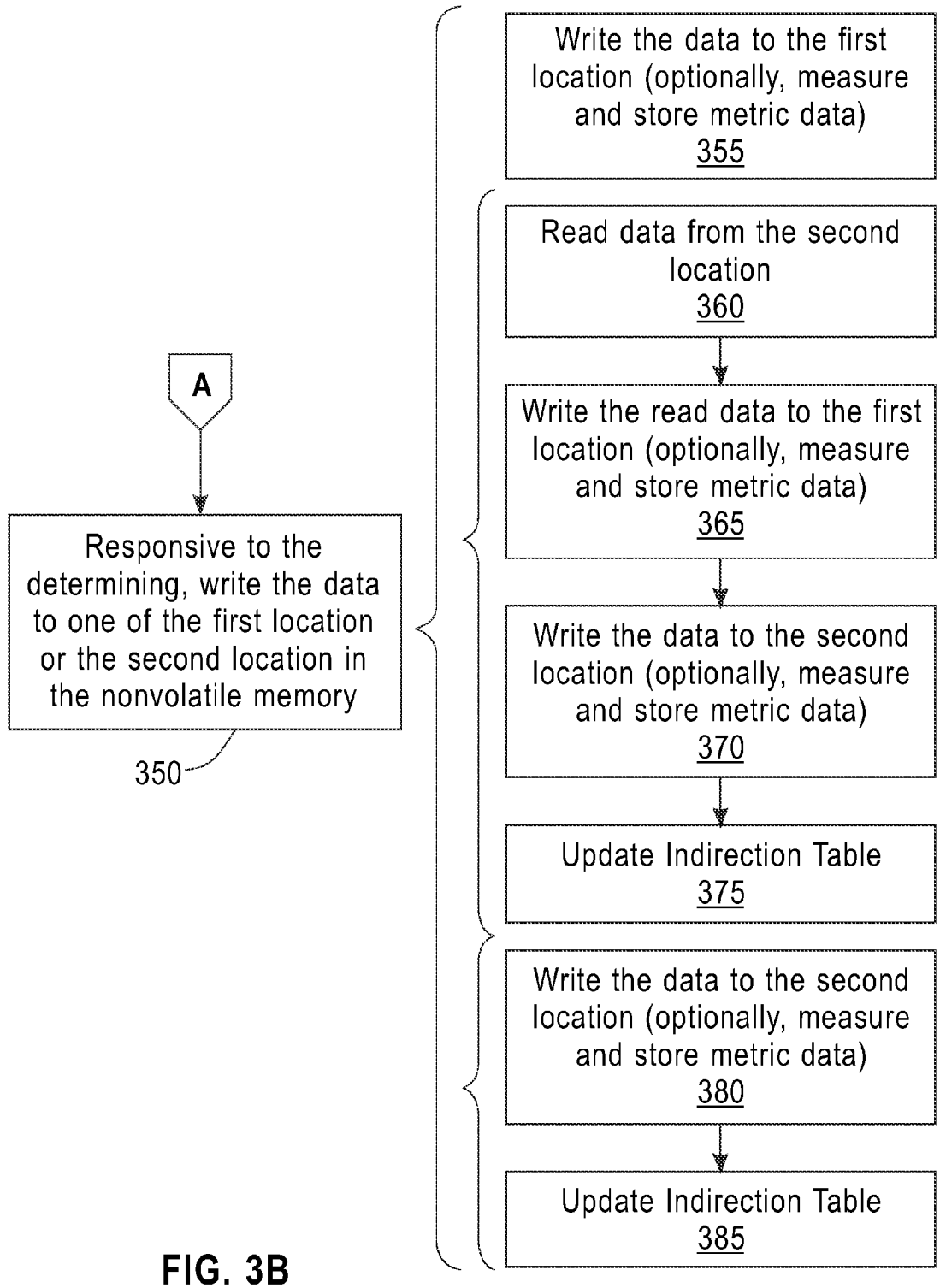

Turning now to FIG. 3, a block diagram is shown of a flowchart to provide variability aware wear leveling in an exemplary embodiment. FIG. 3 is a logic flow diagram performed by hardware (e.g., by the controller 220 executing firmware 230 or by logic elements in controller 220 configured to perform the blocks), performed by a method, or is a result of execution of computer program instructions embodied on a computer readable storage medium such as firmware 230. For ease of reference, it is assumed herein that the blocks in FIG. 3 are performed by a memory controller such as memory controller 220.

In block 305, the memory controller 220 measures and stores wear metric data. The measurement may occur in relation to the process of reading from or writing to the locations in memory (e.g., temporally related to reading from or writing to the locations in memory), may be performed as a process separate from reading from or writing to the locations in memory (e.g., as a background process), may be some combination of these, or may be any other technique for measuring wear of a non-volatile memory. Such processes could, for example, access a memory location, read and decode the stored data and measure the bit error rate; the processes could also for example read the data, buffer the data, test the memory location for stuck cells and then write back the data, putting the stuck cell information in a table. As indicated above, such wear metric data can include one or more of BER, number of stuck bits in the page, write/read latency, number of defects, read and write power, and/or storage capacity. Block 310 illustrates that the memory controller 220 may determine values of metrics of wear metric data. That is, the memory controller 220 may determine (and store) values for average wear, median wear, highest wear and lowest wear.

Note that block 305 (and 310, if performed) may have to be performed for a while before enough wear appears to generate relevant wear data. That is, before block 315 is performed, there may be a number of cycles that could be performed, although this depends on the memory technology. In Flash memory, block 315 could be performed from beginning of life. In other memory types, block 315 could be performed, e.g., at 50-60 percent life.

In a broad sense, the memory controller 220 can, for data 270 to be written to the nonvolatile memory, determine a location in the memory the data 270 should be written based at least on a wear metric 290 corresponding to the location in the nonvolatile memory (e.g., memory device 240). More specifically in an example, in block 315, for data 270 to be written to a first location (e.g., a page 245) in nonvolatile memory (e.g., as indicated by a PPA 110 in indirection table 285 corresponding to the logical address 275), the memory controller 220 can determine whether the data 270 should be written to the first location or written to a second location (e.g., another page 245) in the nonvolatile memory. The determining is based at least on wear metrics 290 corresponding at least to the first and second locations.

In one example, block 315 may be performed by the memory controller 220 wherein the determining is based on swap probability, which is a function of wear (corresponding to wear metrics 290) of first and second locations. See block 320. In general, as described above, higher swap probability should occur for pages with higher wear, and the pages with higher wear should be swapped with pages of lower wear. Block 320 may be performed in an example by blocks 330 and 340. In block 330, the memory controller 220 calculates probability of swap for the first location based on wear (e.g., if wear increases, probability of swap increases). In an embodiment the probability of swap increases exponentially with wear. Functions other than the exponential function can be used as well. In block 340, if the calculated probability indicates a swap should be performed (e.g., the probability meets a threshold, such as being above the threshold), then the memory controller 220 can select one or more candidate locations (either randomly or selected to have less wear than wear of the first location), and select candidate location (e.g., responsive to the amount of wear and physical placement of the location) as the second location. As described below, block 340 may also be one way to perform block 315.

Note that the values of wear metric data from block 310 may be used in blocks 315 to 340. For instance, the probability for the first location may be determined (block 320) based on difference between wear of the first location and the average wear of all locations, e.g., the probability of swap increases as the difference increases between wear of the first location and the average wear of all locations. As another example, the selection of candidate locations (block 330) may be based on the average wear, such that a location is more likely to become a candidate the lower the location's wear is relative to an average wear. Alternatively, the candidates may be selected as a group of locations having the lowest wear as compared to other locations. As another example, the locations within a certain amount of wear from the location having the lowest wear can be candidate locations. As another example of block 315, if the first location is within a certain amount of wear from the location having the highest wear, the block is automatically swapped, and block 340 is performed to select the one or more candidate locations.

In block 350, the memory controller 220, responsive to the determining, writes the data to one of the first location or the second location in the nonvolatile memory. There are multiple options for this, as illustrated by block 355, blocks 360-375, and blocks 380-385. In block 355, the memory controller 220 writes the data to the first location. Additionally, metric data may optionally be measured and stored (see blocks 305 and 310). Block 355 occurs if the determining selects the first location.

Blocks 360-375 occur if the determining selects the second location and the second location is known to contain valid data. In block 360, the memory controller reads data from the second location, then writes the read data to the first location (block 365) (e.g., and optionally measures and stores metric data as in blocks 305 and 310). In block 370, the memory controller writes the data 270 to the second location (e.g., and optionally measures and stores metric data as in blocks 305 and 310). In block 375, the memory controller 220 updates the indirection table 285 to indicate the swap (i.e., the PPAs 110 are changed for the two LAs 130 corresponding to the first and second locations).

Blocks 380-385 may be performed if the determining selects the second location and it is known the second location does not contain valid data. In this case, the first location would be marked as no longer having valid data. The memory controller 220 writes the data 275 to the second location (block 380) (e.g., and optionally measures and stores metric data as per blocks 305 and 310). In block 385, the memory controller 220 updates the indirection table 285 to indicate the swap (i.e., the PPAs 110 are changed for the two LAs 130 corresponding to the first and second locations).

Regarding variability-aware wear leveling for nonvolatile memory not using write-in-place, in an embodiment, the memory device is a NAND Flash memory device wherein the minimum erase unit is a block consisting of multiple pages. Before proceeding with additional description of exemplary embodiments herein useful for NAND Flash memory devices, a description is presented of typical NAND Flash memory devices.

Figure 4:
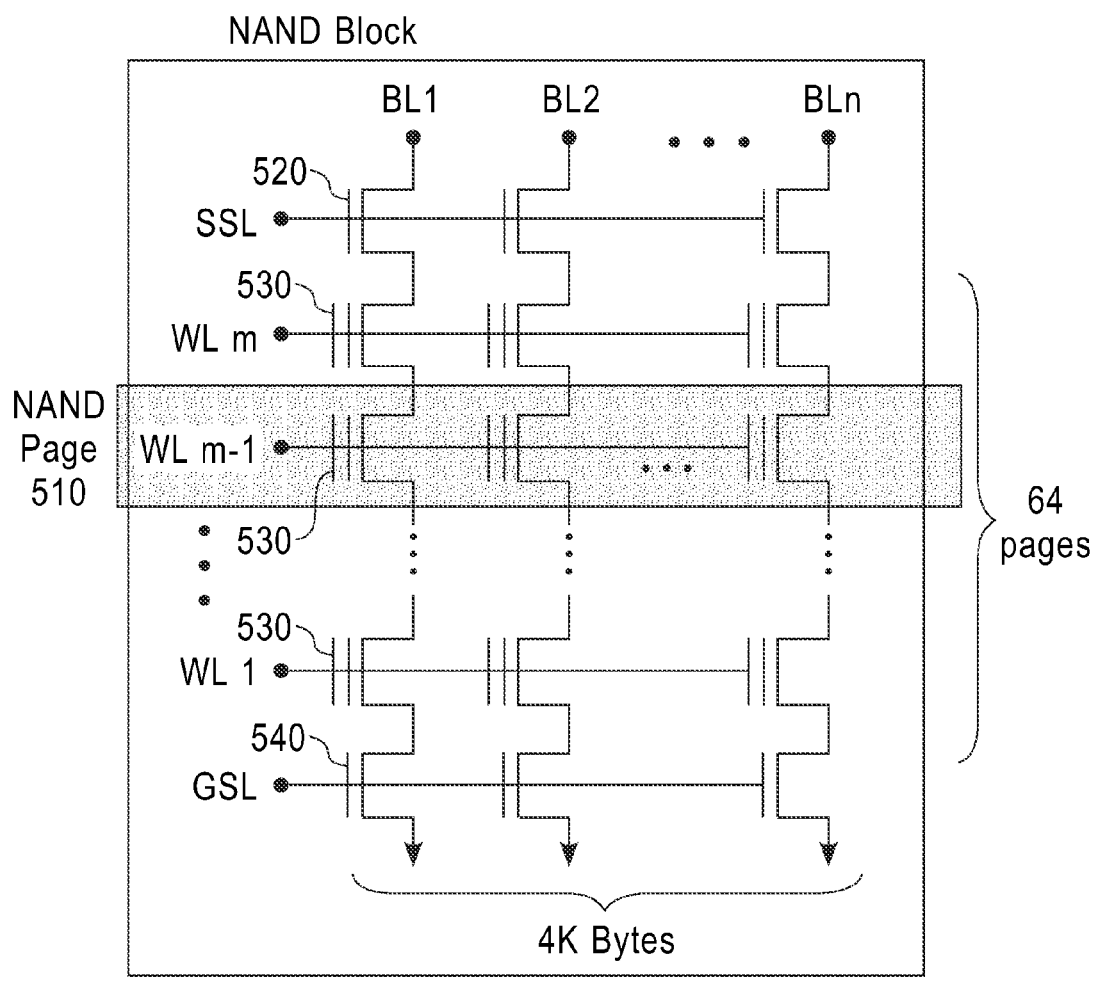
FIG. 4 is a block diagram of an exemplary NAND block forming a portion of a NAND memory device.

Turning to FIG. 4, a block diagram is shown of an exemplary NAND block 500 forming a portion of a NAND memory device. NAND block 500 includes a row of transistors 520 enabled or disabled using a String Select Line (SSL), a row of transistors 540 enabled or disabled using a Ground Select Line (GSL), and m rows of storage cells 530. Each of the rows in this example has 4 k bytes, where "k" is 1024. There are n columns, each of which corresponds to a bitline (BL). Each of the rows of storage cells 530 is a NAND page 510 and is accessed using a corresponding wordline (WL). This example has 64 pages 510.

In NAND Flash, pages are the smallest write units, and blocks (e.g., 64 pages) are the smallest erase units. Once a cell 530 is programmed (e.g., changed from 1 to 0), the cell 530 cannot be changed, until the entire block 500 is erased. Block erasing is a very costly operation (the operation takes about 2 ms, milliseconds), so erasing needs to be performed as rarely as possible. Thus, in practice, when a logical address has to be rewritten, the logical address is mapped to a different physical page 510, and the old page is invalidated. This sets up the need for garbage collection to free invalid pages.

Figure 5:
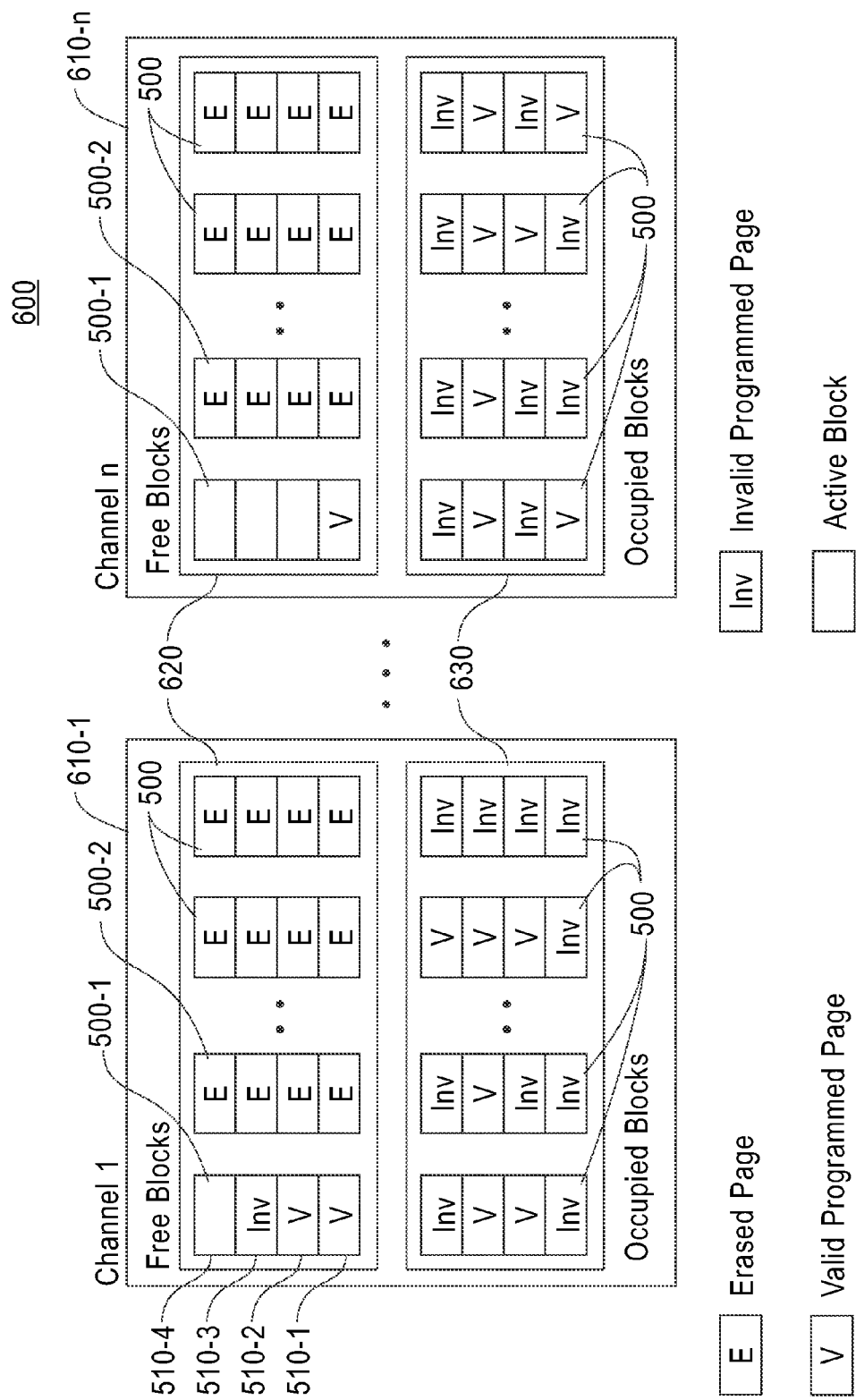
FIG. 5 is a block diagram of a typical NAND Flash setup for a NAND memory device.

Referring to FIG. 5, a block diagram of a typical NAND Flash setup for a NAND Flash memory device 600 is shown. There are n channels 610 in the NAND Flash memory device 600. Each channel 610 has both free blocks 620 and occupied blocks 630. This example shows there are two active blocks 500-1 and 500-2 in each of the free blocks 620. Each block 500 may include erased pages 510 (marked with an "E"), valid programming pages 510 marked with a "V"), or invalid programmed pages 510 (marked with an "Inv"). The "clear" pages (510-1 and three pages in block 500-1 of Channel n) represent erased pages within a non-erased block, i.e., blocks which have some non-erased pages (and some erased pages).

NAND Flash has page-write but block-erase (each block is typically 64-128 pages). A block 500 has to be erased before a page 510 on the block 500 can be re-written. Pages 510 on a block are written sequentially, e.g., from bottom to top in FIG. 5. That is, for block 500-1 in channel 610-1, first page 510-1 would be written, then page 520-2 would be written, then page 520-3 would be written, then finally page 520-4 would be written. A Flash channel 610 includes multiple devices each of which includes multiple blocks. Each Flash device, and hence channel 610, has free blocks 620 and occupied blocks 630. Free blocks 620 have at least one erased page. Flash is typically log-based. Each Flash channel 610 has one or more "active" blocks shown as blocks 500-1 and 500-2 in this example. New page writes on the channel are performed to the active blocks. In particular, the next free page 510 in a selected active block (e.g., 500-1) is written to in sequence. That is, referring to block 500-1 of free blocks 620, page 530-1 is written to before page 510-2 is written to.

Figure 6:
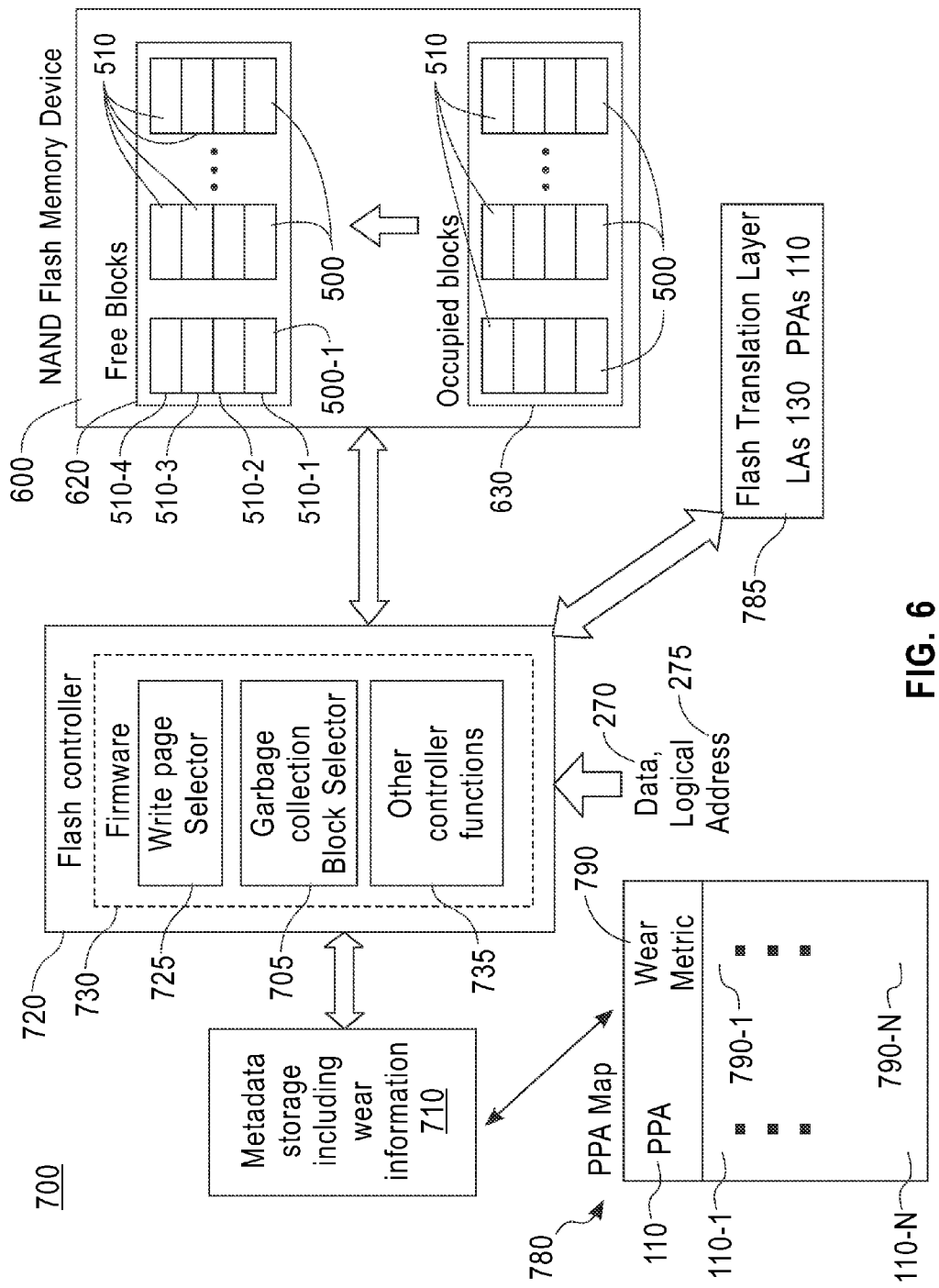
FIG. 6 is a block diagram of an exemplary NAND Flash memory in accordance with an exemplary embodiment of the instant invention.

FIG. 6 is a block diagram of an exemplary NAND Flash memory in accordance with an exemplary embodiment of the instant invention. NAND Flash memory 700 includes a memory controller 720 that accesses (e.g., reads from and writes to) NAND Flash memory device 600. Flash controller 720 also accesses (e.g., reads from and writes to) metadata storage 710, which includes wear information. Flash controller 720 also accesses (e.g., reads from and writes to) Flash translation layer 785, which, e.g., maps logical addresses 130 to physical page addresses (PPAs) 110. The NAND Flash memory device is shown in FIG. 5, although for simplicity the channels 610 are not shown in FIG. 6. The Flash controller 720 includes a write page selector 725, a garbage collection block selector 705, and other controller functions 735. The Flash controller 720 implements probabilistic swap-based page selection for writes, e.g., using write page selector 725, and probabilistic swap-based page selection for garbage collection, e.g., using garbage collection block selector 705. Some part or all of the Flash controller 720 may be implemented via firmware 730, which is a computer readable storage medium having computer readable program code embodied therewith. Firmware 730 may be updated to modify functionality, and the Flash controller 720 may therefore be or include circuitry (e.g., a processor) configured to execute the computer readable program in the firmware 230. Alternatively or in addition, some or all of the functionality of memory controller 220 may be implemented strictly in hardware, such as by circuitry in an integrated circuit.

One example of metadata storage 710 is shown as a PPA map 780. The PPA map 780 includes a wear metric 790 and the PPAs 110 correspond to the pages 510. Metadata tracking the wear of each physical page 510 is included as the wear metric 790. Each logical address 130 corresponds to one of the PPAs 110-1 through 110-N and a wear metric 790-1 through 790-N.

Some metadata for each page is stored in the indirection table (typically referred to as a Flash Translation Layer, FTL), illustrated in FIG. 6 as the FTL 785, or in some other part of memory (volatile or nonvolatile) which tracks the health of the page. In the example of FIG. 6, the PPA map 780 includes the wear metric 790, but the wear metric 790 may be placed in the FTL 785 if desired. In this example, health may be measured, for example, in terms of the recent bit error rate seen on the page and stored as wear metric 790. As stated above, the NAND Flash memory device 600 is used as a log buffer, which has a few active blocks 510 which are currently being written to. Since a Flash block has to be written sequentially, each active block has an active page (such as active page 510-1), i.e., a first page in a sequence which has not yet been written to.

In one embodiment, when a page write is to be performed, a pool of candidate physical pages 510 to write to is collected, which includes the active pages 510 in the active blocks 500 as well as other erased pages 500 (for example, all the pages which sequentially follow the active pages). One of these collected pages is selected by a probabilistic page selection method, where the probability of selecting a particular page is a function of the health of the page as well as the difference in the indices of the page and the current active page in the same block. That is, the probability is based in part on the number of sequential pages skipped. For instance, assume the pages 510-1 through 510-4 in block 500-1 are active (or page 510-1 is active and the blocks 510-2 through 510-4 are erased and available). Assuming the health (as measured by a corresponding wear metric 790) of each page 510-1 through 510-4 is the same. The probability of selecting page 510-1 is the highest; the probability of selecting page 510-2 is lower; the probability of selecting page 510-3 is still lower; and the probability of selecting page 510-4 is the lowest. In an exemplary embodiment, the probability of selecting the page is weighed by a geometrically decaying probability, e.g., 1-p is the probability of selecting 510-1, p(1-p) is the probability of selecting 510-2, p2(1-p) is the probability of selecting 510-3, and so forth, except for the last page available which absorbs the tail probability of the geometric distribution. In an additional embodiment, the probabilities for 510-1, 510-2, etc., are labeled p1, p2, etc., and are optimized, for example by means of a simulated annealing optimization technique, so as to prevent the write amplification factor to be beyond a pre-specified threshold. In general, skipping active pages increases write amplification by reducing the effective spare area associated with the storage pool.

An exemplary advantage of this method is that the method (e.g., occasionally) skips pages with poor health, and thereby has an equalizing effect on the wear of the Flash memory. This occasional skipping has multiple beneficial effects. The occasional skipping allows the Flash device to wear out uniformly, which improves the life time of the device, and allows low rate scrubbing to be used for much of the lifetime of the memory. Scrubbing is a technique where data is periodically read, verified, and rewritten.

In an alternative embodiment, some active Flash blocks may be non-writable at the time of the request, because the corresponding Flash plane is busy performing some other operation such as an erase. Such blocks are excluded during the candidate page collection process. The Flash plane (also called a Flash die) is independent of the controller 720. The controller 720 typically deals with multiple Flash planes, some of which are busy at a given time, and some of which are non-busy. So, a Flash plane being busy does not imply that the Flash controller is busy. In fact, one of the jobs of the controller 720 is to keep track of busy and non-busy Flash planes, and schedule operations on non-busy Flash planes. The Flash controller 720 is assumed not to be busy or at least not busy in a more significant way than the Flash dies are. If a Flash die is busy doing an operation, all other operations on that die will have to wait.

In another embodiment, the health of the pages 510 is aggregated to form an estimate of block health for each Flash block 500. During garbage collection, when a block is to be erased, the factors used to select the block 500 to be erased include the block health. This allows blocks with many low health pages to be erased (and hence written) less frequently, thereby equalizing the wear over the device. Examples of methods used to aggregate page health information include using the mean or median page health for all pages in the block, and using the worst page health in the block.

In another embodiment, a global cumulative distribution of page health over the device 600 is maintained. Whenever an active page 510 has a health which is less than a health of a certain percentage of pages 510 (for example 95 percent), the active page 510 is always skipped during writing.

In another embodiment, static data (i.e., data which is deemed unlikely to be modified in the near future) is written to blocks 500 with poor health (e.g., or blocks which have many pages with poor health), and dynamic data (i.e., data which is deemed likely to be modified quickly/frequently) is written to blocks 500 with good health.

Figure 7A:
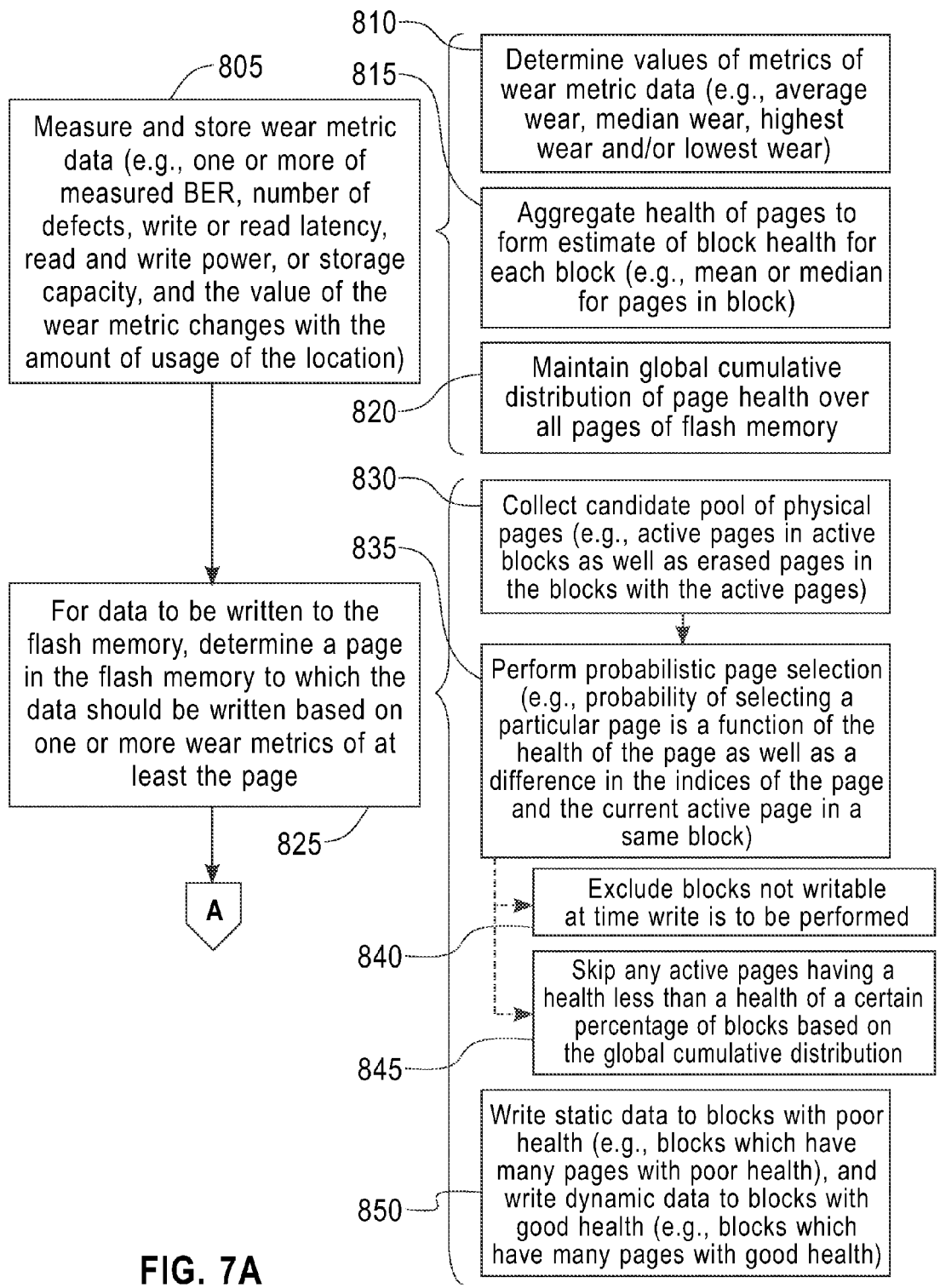
FIG. 7 is a block diagram of a flowchart to provide variability aware wear leveling in an exemplary embodiment.
Figure 7B:
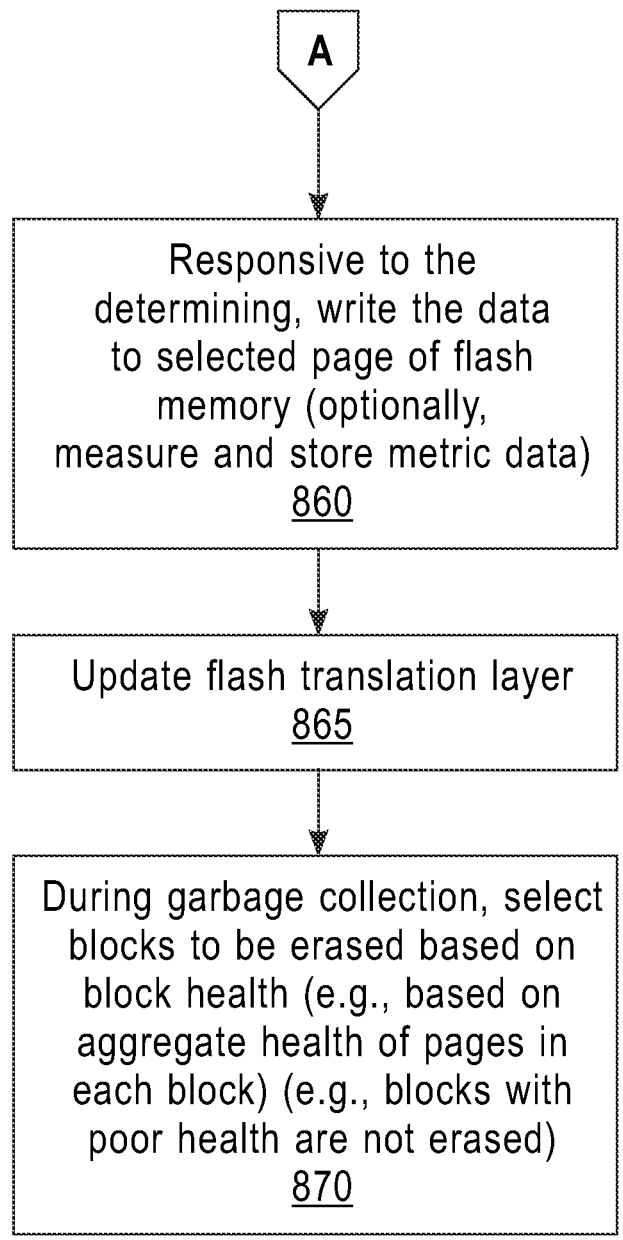

Turning to FIG. 7, a block diagram is shown of a flowchart to provide variability aware wear leveling in an exemplary embodiment. FIG. 7 is a logic flow diagram performed by hardware (e.g., by the Flash controller 720 executing firmware 730 or by logic elements in Flash controller 720 configured to perform the blocks), performed by a method, or is a result of execution of computer program instructions embodied on a computer readable storage medium. For ease of reference, it is assumed herein that the blocks in FIG. 7 are performed by a memory controller such as Flash controller 720.

In block 805, the Flash controller 720 measures and stores wear metric data, e.g., on a per-page and per-block basis. The measurement may occur in relation to the process of reading from or writing to the locations in memory (e.g., temporally related to reading from or writing to the locations in memory), may be performed as a process separate from reading from or writing to the locations in memory (e.g., as a background process), may be some combination of these, or may be any other technique for measuring wear of a non-volatile memory. Such processes could, for example, access a memory location, read and decode the stored data and measure the bit error rate; the processes could also for example read the data, buffer the data, test the memory location for stuck cells and then write back the data, putting the stuck cell information in a table. Such wear metrics 790 include one or more of measured BER, number of defects, write or read latency, read and write power, or storage capacity, and the value of the wear metric changes with the amount of usage of the location. Blocks 810-820 are examples of block 805 and include additional wear metrics 790. In block 810, the controller 720 determines values of metrics of wear metric 790 data (e.g., average wear, median wear, highest wear and/or lowest wear). Block 810 is typically performed per-page but some or all of this data may be taken per-block (as described in block 815). In block 815, the Flash controller 720 aggregates health of pages (e.g., corresponding to wear metrics 790 of the pages 510) to form an estimate of block health for each block 500. As described above, such aggregate can be a mean or a median for pages in a block. In block 820, the Flash controller maintains a global cumulative distribution of page health (e.g., corresponding to wear metrics 790 of the pages 510) over all pages 510 of Flash memory. As described above, block 805 may be performed for some time period prior to performing block 825 and higher numbered blocks, in order for wear metric data to accumulate. Metric and health are used interchangeably herein. Health is somewhat generic and metric is somewhat more precise, as the term metric quantifies a measure of health thus in fact defining precisely an exemplary meaning of health. Health is inversely related to wear, as the higher the wear, the worse the health. The use of the term "health" in FIG. 7 may therefore be replaced with the term "wear", if desired.

In block 825, the Flash controller 720, for data 270 to be written to the Flash memory, determines a page 510 in the Flash memory (e.g., NAND Flash memory device 600) to which the data 270 should be written based on one or more wear metrics of at least the page 510. Block 825 may be performed by blocks 830-835 or by block 850, as illustrative examples.

In block 830, the Flash controller 720 collects a candidate pool of physical pages 510. As described above, the candidate pool can include e.g., active pages in active blocks as well as erased pages in the blocks with the active pages. In block 835, the Flash controller 720 performs a probabilistic page selection. The probabilistic page selection may include where a probability of selecting a particular page 510 is a function of the health (e.g., as determined by the metrics 790) of the page 510 as well as a difference in the indices of the page 510 (e.g., page 510-4) and the current active page 510 (e.g., 510-1) in a same block 500 (e.g., 500-1), as described above. As a specific example of probability functions, one may divide each page's health score by the total sum of the health scores of the pages being considered for the new write. In one exemplary technique for performing block 835, in block 840, the Flash controller 720 excludes blocks 500 not writable at the time the write of the data 270 is to be performed. That is, unavailable blocks 500 do not form part of the candidates. In another example of performing block 835, in block 845, the Flash controller 720 skips any active pages 500 having a health (e.g., corresponding to wear metrics 790) less than a health of a certain percentage of pages 510 based on the global cumulative distribution, e.g., as determined in block 820. This has been described above.

In block 850, another technique for performing block 825 is shown. The Flash controller 720 writes static data to blocks 500 with poor health (e.g., blocks 500 which have many pages 510 with poor health). Alternatively, the Flash controller 720 writes dynamic data to blocks 500 with good health (e.g., blocks 500 which have many pages 510 with good health, where health is determined using wear metrics 790). That is, data 270 is written to a block with poor health in response to a determination the data is static data or is written to a block with good health in response to a determination the data is dynamic data. For "poor" and "good" health for blocks, a block having poor health means, e.g., a block with a majority of pages having values of a wear metric below an average value of a wear metric and a block having good health may mean a block with a majority of pages having values of a wear metric above an average value of a wear metric. A page with poor health is one whose measured wear metrics are lower than an average and a page with good health is one whose measured wear metrics are higher than an average. These are only examples of good/ poor health for blocks and pages. To determine static/dynamic data, one can keep in a table a count of how many times a logical (not physical) address has been written. Logical addresses which are written to less than average can be considered static and logical addresses which are written to more than average can be considered dynamic.

In block 860, the Flash controller 720, responsive to the determining, writes the data 270 to the selected page 510 of Flash memory (e.g., and optionally measures and stores metric data as in blocks 805-820). In block 865, the Flash controller 720 updates the Flash translation layer 785 so that the logical addresses 130 and the PPAs 110 correspond correctly.

Another option described above concerns garbage collection. In block 870, the Flash controller 720, during garbage collection, selects blocks 500 to be erased based on block health. That is, blocks having a value of health not meeting (e.g., beneath) some threshold are not collected. This would result in the desired effect of not putting blocks with poor health back in the pool of available blocks for writing. In an example, this is based on aggregate health of pages 510 in each block 500 taken in block 815.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining a health for each location in a nonvolatile memory based at least on one or more wear metrics corresponding to each location, where the one or more wear metrics are based on measurements of the location, the measurements estimating physical wear of each location;
    creating a global cumulative distribution based on the determined health of each location;
    collecting a candidate pool of physical locations for data to be written to skipping any location having a health less than a health of a predetermined percentage of locations based on the global cumulative distribution;
    selecting a location from the candidate pool based on a probability, where the probability is a function of the health of the selected location; and
    writing the data to the selected location in the nonvolatile memory.

2. The method of claim 1, wherein:
    selecting further comprises determining, based on health corresponding at least to first and second locations in the nonvolatile memory, whether the data should be written to the first location in the nonvolatile memory or written to the second location in the nonvolatile memory; and
    writing further comprises writing, responsive to the selecting, the data to one of the first location or the second location in the nonvolatile memory.

3. The method of claim 2, wherein the determining whether the data should be written to the first location in the nonvolatile memory or written to the second location in the nonvolatile memory is based on a swap probability that is a function of health for both the first and second locations.

4. The method of claim 3, wherein the determining whether the data should be written to the first location in the nonvolatile memory or written to the second location in the nonvolatile memory further comprises calculating a probability of a swap for the first location based on health corresponding to the first location, and, in response to the calculated probability indicating a swap should be performed, selecting one or more candidate locations, and selecting one of the one or more candidate locations as the second location according to health of the one or more candidate locations and of the first location.

5. The method of claim 4, further comprising determining one or more average values for health of all locations in the nonvolatile memory, and wherein calculating a probability of a swap for the first location based on health corresponding to the first location further comprises calculating a probability of the swap for the first location based on health corresponding to the first location as compared to the one or more average values.

6. The method of claim 2, wherein the further determining whether the data should be written to the first location in the nonvolatile memory or written to the second location in the nonvolatile memory further comprises determining based at least on health corresponding to the first location that data should be written to the second location, and, in response, selecting one or more candidate locations having greater health than health of the first location, and selecting one of the one or more candidate locations as the second location.

7. The method of claim 6, wherein:
    selecting one or more candidate locations further comprises selecting one of the one or more candidate locations responsive to health and physical placement of the one or more candidate locations.

8. The method of claim 2, wherein the nonvolatile memory comprises a storage-class memory.

9. The method claim 8, wherein the storage-class memory comprises a phase-change memory.

10. The method of claim 2, wherein each location in the nonvolatile memory comprises a set of memory cells written at a same time, as part of a single write operation.

11. The method of claim 1, wherein:
    selecting further comprises determining, based on health corresponding to more than two locations in the nonvolatile memory, to which one location of the more than two locations the data should be written; and
    writing further comprises writing, responsive to the further determining, the data to the one location in the nonvolatile memory.

12. The method of claim 1, wherein the nonvolatile memory comprises Flash memory comprising pages of memory organized into blocks, and wherein locations in the nonvolatile memory are pages of the nonvolatile memory.

13. The method of claim 12, wherein selecting the location comprises:
    determining the location should be within a page in a block with poor health in response to the data determined to be static data; or
    determining the location should be to a page in a block with good health in response to the data determined to be dynamic data.

14. The method of claim 12, further comprising, during garbage collection of blocks of the Flash memory, selecting blocks to be erased based on health of the blocks, wherein health of a block corresponds to an aggregate health of all pages in the block.

15. The method of claim 14, wherein blocks with health not meeting a threshold are not collected.

16. The method of claim 12, wherein the Flash memory comprises NAND Flash memory.

17. The method of claim 1, wherein collecting a candidate pool comprises selecting active locations in active blocks as well as erased locations in active blocks.

18. The method of claim 1, wherein the probability as a function of health comprises a difference in indices of a particular location and a current active location in a block.

19. The method of claim 1, wherein the probability further comprises excluding blocks not writable at a time the data should be written to the selected location.

20. The method of claim 1, wherein the probability further comprises skipping any active location having a heath less than a health of a certain percentage of locations based on the global cumulative distribution.

21. The method of claim 1, wherein the one or more wear metrics comprise at least one of or an estimate of at least one of measured bit-error rate, number of defects, write or read latency, read and write power, or storage capacity, and a value of the one or more wear metrics changes with an amount of usage of a location.

22. A computer program product, comprising:
a non-transitory computer readable storage medium having computer readable program code embodied therewith, the computer readable program code configured to perform or control at least the following: determining a health for each location in a nonvolatile memory based at least on one or more wear metrics corresponding to each location, where the one or more wear metrics are based on measurements of the location, the measurements estimating physical wear of each location;
creating a global cumulative distribution based on the determined health of each location;
collecting a candidate pool of physical locations for data to be written to skipping any location having a health less than a health of a predetermined percentage of locations based on the global cumulative distribution;
selecting a location from the candidate pool based on a probability, where the probability is a function of the health of the selected location; and
writing the data to the selected location in the nonvolatile memory.

23. An apparatus comprising:
at least one processor; and
at least one memory including computer program code, wherein the at least one processor, in response to execution of the computer program code, is configured to cause the apparatus to perform at least the following:
determining a health for each location in a nonvolatile memory based at least on one or more wear metrics corresponding to each location, where the one or more wear metrics are based on measurements of the location, the measurements estimating physical wear of each location;
creating a global cumulative distribution based on the determined health of each location;
collecting a candidate pool of physical locations for data to be written to skipping any location having a health less than a health of a predetermined percentage of locations based on the global cumulative distribution;
selecting a location from the candidate pool based on a probability, where the probability is a function of the health of the selected location; and
writing the data to the selected location in the nonvolatile memory.

24. The apparatus of claim 23, wherein:
selecting further comprises determining, based on health corresponding at least to first and second locations in the nonvolatile memory, whether the data should be written to the first location in the nonvolatile memory or written to the second location in the nonvolatile memory; and
writing further comprises writing, responsive to the selecting, the data to one of the first location or the second location in the nonvolatile memory.

25. The apparatus of claim 24, wherein the determining whether the data should be written to the first location in the nonvolatile memory or written to the second location in the nonvolatile memory is based on a swap probability that is a function of health for both the first and second locations.

* * * * *